(12) United States Patent
Wu

(10) Patent No.: US 7,420,753 B2
(45) Date of Patent: Sep. 2, 2008

(54) ROTATABLE LENS SET

(75) Inventor: Ruey-Der Wu, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 89 days.

(21) Appl. No.: 11/466,784

(22) Filed: Aug. 24, 2006

(65) Prior Publication Data
US 2007/0047106 A1 Mar. 1, 2007

(30) Foreign Application Priority Data
Aug. 24, 2005 (CN) .......................... 2005 1 0092570

(51) Int. Cl.
G02B 7/02 (2006.01)
G02B 15/14 (2006.01)

(52) U.S. Cl. .................. 359/811; 359/694; 359/823

(58) Field of Classification Search ................ 359/359, 359/694, 811, 819–823; 396/79, 80, 83, 396/84, 85, 176, 349, 448
See application file for complete search history.

(56) References Cited

U.S. PATENT DOCUMENTS 4,961,635 A * 10/1990 Kondo et al. ................ 359/701
5,548,446 A    8/1996 Enomoto .................... 359/695
6,008,954 A * 12/1999 Shintani et al. ............. 359/704
6,631,042 B2 * 10/2003 Noguchi ..................... 359/823

FOREIGN PATENT DOCUMENTS

| CN | 1439929 | 9/2003 |
|---|---|---|
| CN | 1614456 | 5/2005 |
| JP | 07-199019 | 4/1995 |

* cited by examiner

Primary Examiner—Mohammed Hasan
(74) Attorney, Agent, or Firm—Thomas, Kayden, Horstemeyer & Risley

(57) ABSTRACT

A lens set assembly comprises an object side facing an object, an image side facing an image generated by the lens set, and a plurality of lens sets disposed from the object side to the image side sequentially. When the lens set assembly is used, the lens sets are all disposed along an optical axis. When the lens set assembly is not in use, the lens set adjacent to the image side rotates about an axis perpendicular to the optical axis to depart from the optical axis, and the other lens sets move toward the image side.

10 Claims, 11 Drawing Sheets

ROTATABLE LENS SET

BACKGROUND OF THE INVENTION

1. Field of the Invention

The invention relates to a rotatable lens set, and in particular to a lens set capable of moving along an optical axis and rotating about an axis perpendicular to the optical axis to depart from the optical axis.

2. Description of the Related Art

A retractable optical lens of an optical device, such as a digital camera, is typically a zoom lens. The focal length of a zoom lens is varied by changing the relative position of a plurality of lens sets. Such an optical lens can retract into a housing when the optical device is turned off, and extend when turned on. In a conventional retractable optical lens, one or more lens sets move along an optical lens. Length of such a retractable optical lens is limited to the total length of all optical elements when retracted, with the overall thickness of the housing limited correspondingly.

Japan patent JP07-199019 discloses a lens set capable of shortening the total length of the lens set, as shown in FIG. 1, wherein, when the lens retracts, an inner converting lens 11 rotates about an axis perpendicular to the optical axis (hereinafter perpendicular axis) to one side of the second lens set 5 to depart from the optical axis. FIG. 2A depicts the conventional retractable lens in wide angle use. FIG. 2B depicts the conventional retractable lens in middle focal length use. FIG. 2C depicts the conventional retractable lens in long focal length use. The inner converting lens 11 rotates about the perpendicular axis to reach the optical axis and is positioned between the first lens set 1 and the second lens set 5. During use, image capture is interrupted by the inner converting lens 11 moving in or out, and the optical axis of the first lens set 1 and the second lens set 5 must be aligned with the optical axis of the inner converting lens 11 when retracting. If the pin 12b is not operated properly, the optical axis of the inner converting lens 11 is not aligned with optical axis of the first and second lens set 1 and 5, causing inaccurate image capture.

BRIEF SUMMARY OF INVENTION

An embodiment of a lens set assembly comprises an object side facing an object, an image side facing an image generated by the lens set assembly, and a plurality of lens sets disposed from the object side to the image side sequentially. When the lens set assembly is used, the lens sets are all disposed along an optical axis. When the lens set assembly is not in use, the lens set adjacent to the image side rotates about an axis perpendicular to the optical axis to depart from the optical axis, and the other lens sets move toward the image side.

The embodiment further comprises a driving portion and a base. The driving portion moves the lens set adjacent to the image side along the optical axis when the lens set is used and rotates the lens set adjacent to the image side about the axis perpendicular to the optical axis. The base bears the driving portion and the lens set adjacent to the image side.

The lens set adjacent to the image side comprises at least one lens adjacent to the image side, a moving frame, an inner frame and a torsion spring. The moving frame comprises a stage on one side thereof, which comprises a first through hole along the optical axis and a second through hole along the axis perpendicular to the optical axis. The inner frame secures the lens and comprises at least one arm extending from one side thereof and a shaft disposed on the end of the arm and perpendicular thereto. The torsion spring has one end fixed to the inner frame and the other end fixed to the moving frame. The shaft is inserted into the torsion spring and the second through hole.

The driving portion comprises a motor, a gear set, a screw bar, a compression spring and a nut. The gear set is disposed on the base engaging the motor. The screw bar has one end joined to the gear set through which the screw bar is rotated by the motor. The screw bar is inserted into the compression spring. The nut is joined to the screw bar after the compression spring and the moving frame joined to the screw bar, whereby the stage is clamped between the spring and the nut.

The embodiment further comprises a track frame and a block. The track frame is perpendicularly joined to the base along the optical axis and fixed to the other end of the screw bar, having a groove on one side extending along the optical axis. The block has a track comprising a first surface parallel to the base, a second surface perpendicular to the base, and a curved surface connecting the first and second surfaces. The screw bar is perpendicular to the base with one end fixed to the track frame and the other end fixed to the base.

The nut has a protrusion engaging the groove. When the screw bar rotates, the track frame constrains the nut along the optical axis without rotation.

The nut further has an abutting portion. When the distance between the nut and the base exceeds a predetermined height, the abutting portion abuts the inner frame and the nut and the compression spring clamp the moving frame to move, whereby the motor rotates the screw bar through the gear set to move the moving frame and the inner frame. When the distance between the nut and the base is less than the predetermined height, the abutting portion abuts the inner frame along the optical axis, and when the screw bar moves the nut toward the base, a cam of the inner frame abuts the track and slides from the first surface to the second surface via the curved surface, such that the nut and the compression spring simultaneously clamp the moving frame toward the base and the inner frame is rotated about the shaft to depart from the optical axis.

The stage comprises a third through hole, and the driving portion further comprises a primary shaft parallel to the optical axis and extending through the third through hole. The primary shaft is fixed to the track frame, whereby the moving frame moves along the optical axis.

The base comprises a secondary shaft disposed along the optical axis, and the moving frame further comprises a holding portion disposed on one side facing the stage and holding the secondary shaft, whereby the moving frame moves along the optical axis.

The lens set, adjacent to the image side, further comprises a filter disposed between the lens and the image side and fixed to the inner frame.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
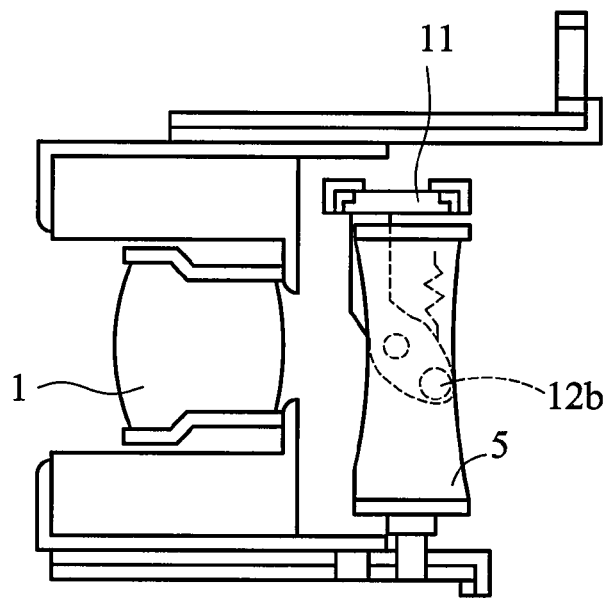
FIG. 1 is a schematic view of a conventional retractable lens.
Figure 2A:
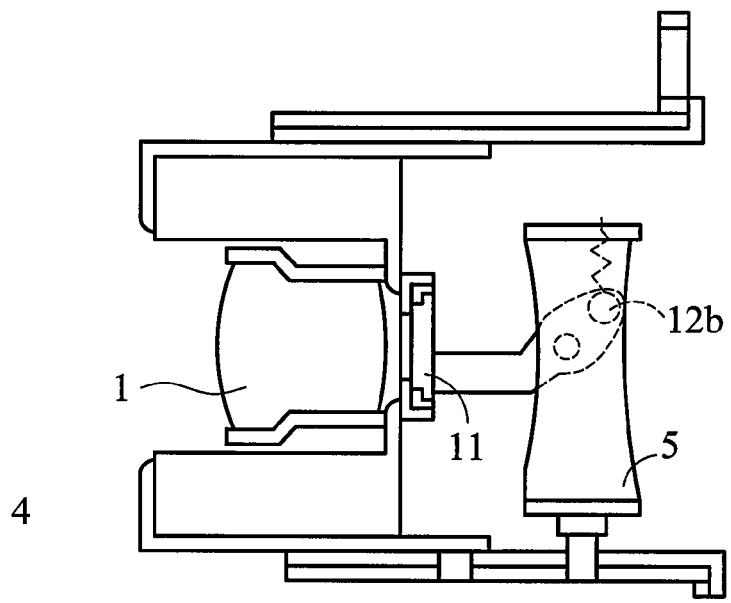
FIG. 2A depicts a conventional retractable lens in wide angle use.
Figure 2B:
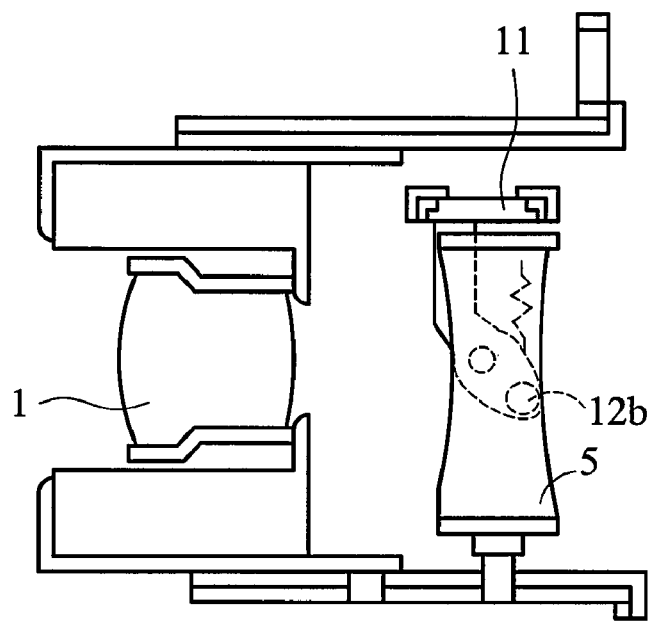
FIG. 2B depicts the conventional retractable lens in middle focal length use.
Figure 2C:
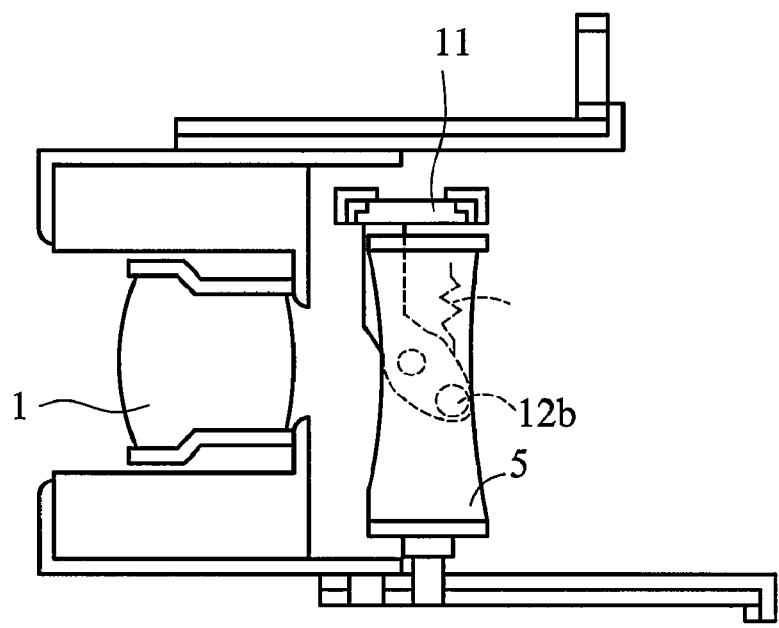
FIG. 2C depicts the conventional retractable lens in long focal length use.
Figure 3:
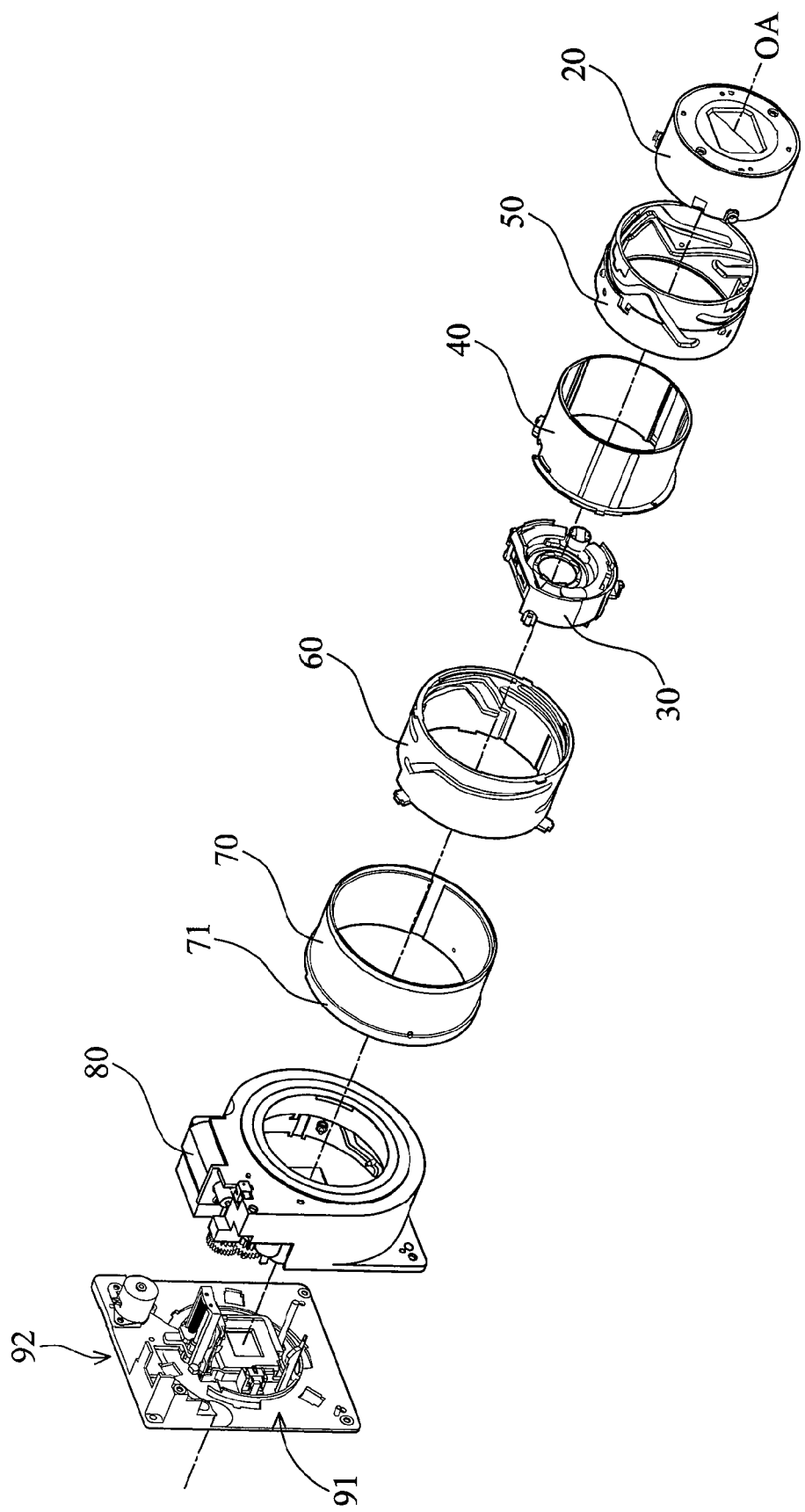
FIG. 3 is an exploded view of a lens set assembly of the invention.

Referring to FIG. 3, a lens set assembly of the invention comprises a first lens cone 20 and a second lens cone 30 near an object side thereof. The first and second lens cone 20 and 30 are put into a sliding cone 40 which is inserted into an operating cone 50. The operating cone 50 rotates to change the distance between the first lens cone 20 and the second lens cone 30, whereby the focal length is varied. The operating cone 50 is assembled to a guiding cone 60 which is joined to a rotating cone 70. The rotating cone 70 is put into a fixed cone 80 which is joined to a base 92. A gear ring 71 formed on the periphery of the rotating cone 70 engages an external gear set (not shown). A motor (not shown) rotates the external gear set to rotate the rotating cone 70 about an optical axis OA between the fixed cone 80 and the base 92. Rotation of the rotating cone 70 is transmitted to the operating cone 50 via the guiding cone 60, whereby the operating cone 50 rotates about the optical axis OA in the guiding cone 60. The operating cone 50 moves the first lens cone 20 and the second lens cone 30 along the optical axis OA, whereby the distance between the first lens cone 20 and the second lens cone 30 is varied to change the focal length. A lens set 91 and a driving portion are disposed on the base 92. The driving portion 93 is capable of moving the lens set 91 along the optical axis OA and rotating the lens set 91 about an axis perpendicular to the optical axis OA.

Figure 4:
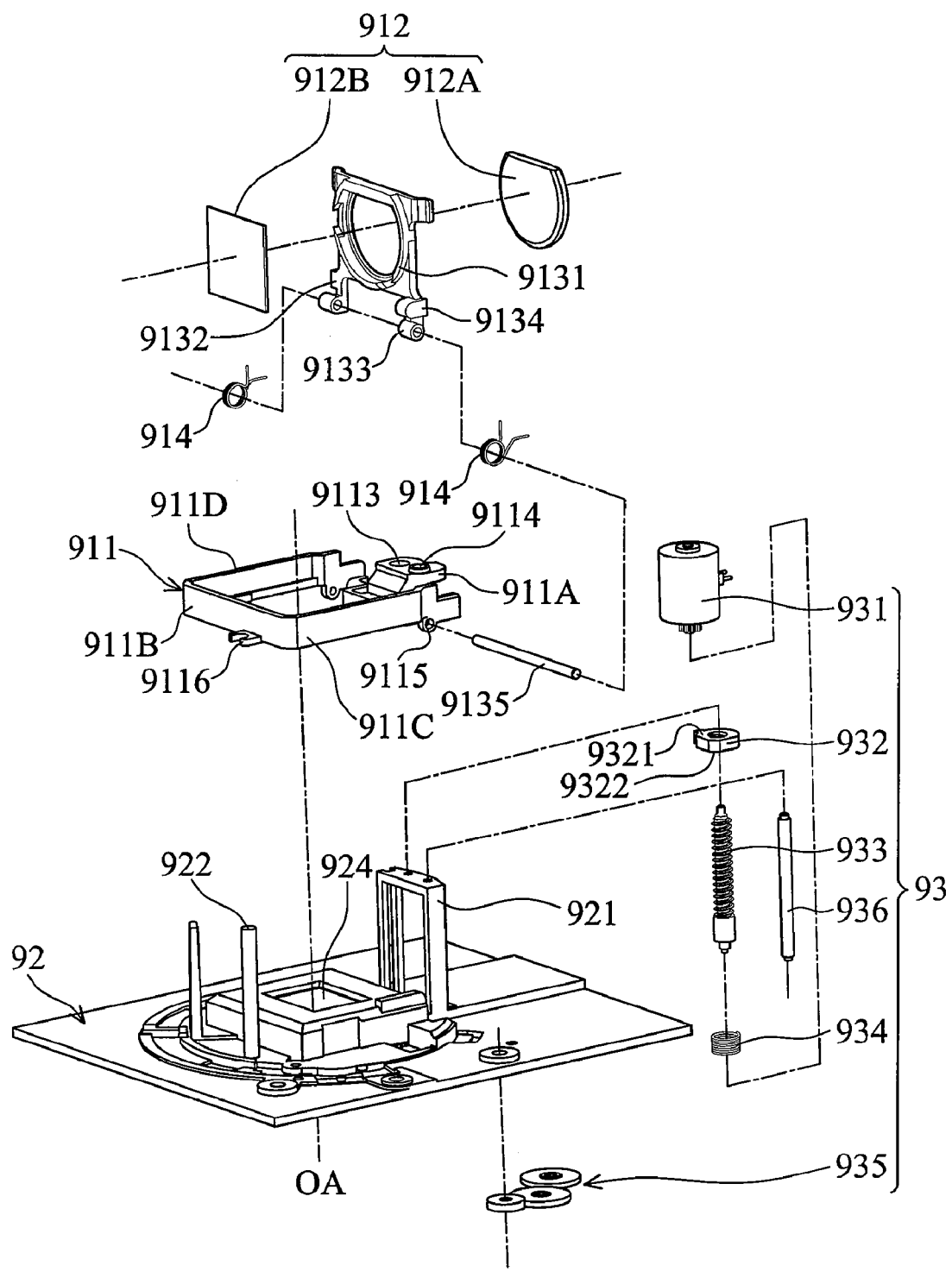
FIG. 4 is an exploded view of a base and a third lens set of the lens set assembly of the invention.

Referring to FIG. 4, the lens set 91 is adjacent to an image side of the lens set assembly to regulate the rear focal length to maintain the image on the CCD (not shown). The lens set 91 comprises a moving frame 911 movable along the optical axis OA, a lens group 912, an inner frame 913 joined to the moving frame 911 and a torsion spring 914. The lens group 912 is fixed by the inner frame 913 and the torsion spring 914. During use, the inner frame 913 is moved along the optical axis OA by the moving frame 911.

In this embodiment, the moving frame 911 has four sides 911A, 911B, 911C and 911D. A stage 9112 is disposed on one side 911A perpendicular to the optical axis OA. The stage 9112 comprises a first through hole 9113 and a second through hole 9114. In addition, a third through hole 9115 perpendicular to the optical axis OA is formed on the side 911A. The inner frame 913 has a side 9131 from which an arm 9132 extends. A shaft holder 9133 is formed at the end of the arm 9132. The shaft holder 9133 extends through the torsion spring 914 and the third through hole 9115, whereby the inner frame 913 can rotate about the shaft holder 9133. A hole is formed on the shaft holder 9133, through which a shaft 9135 extends. The shaft holder 9133 and the shaft 9135 can be formed integrally. The lens group 912 comprises at least one lens 912A fixed to the inner frame 913. During use, the inner frame 913 is moved along the optical axis OA by the moving frame 911 rather than rotating about the axis of the shaft holder 9133. During use, the arm 9132 is substantially perpendicular to the optical axis OA.

Figure 5:
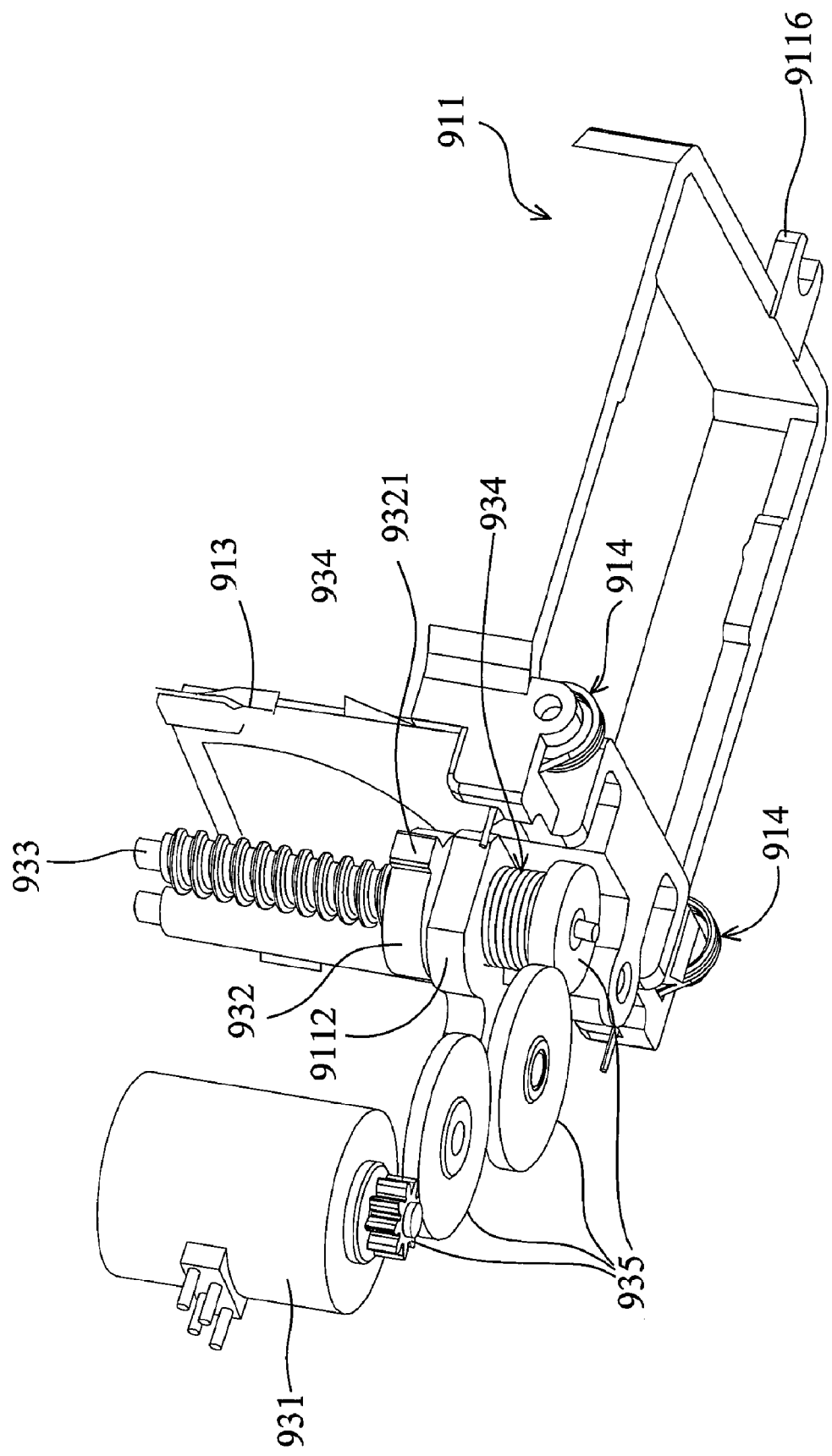
FIG. 5 depicts a driving portion joined to the third lens set of the invention.

Referring to FIGS. 4 and 5, the driving portion 93 comprises a motor 931, a gear set 935 disposed on the base 92 and engaged with the motor 931, a screw bar 933 joined to the gear set 935, a compression spring 934 into which he screw bar 933 is inserted and a nut 932 joined to the screw bar 933. When one end of the screw bar 933 is joined to the gear set 935 disposed on the base 92, the compression spring 934, the stage 9112 and the nut 932 are joined to the screw bar 933 sequentially. In this embodiment, the stage 9112 is clamped by the compression spring 934 and the nut 932. When the motor 931 drives the gear set 935 to rotate the screw bar 933, the stage 9112 clamped by the compression spring 934 and the nut 932 moves along the optical axis OA due to rotation and movement of the nut 932.

Figure 6:
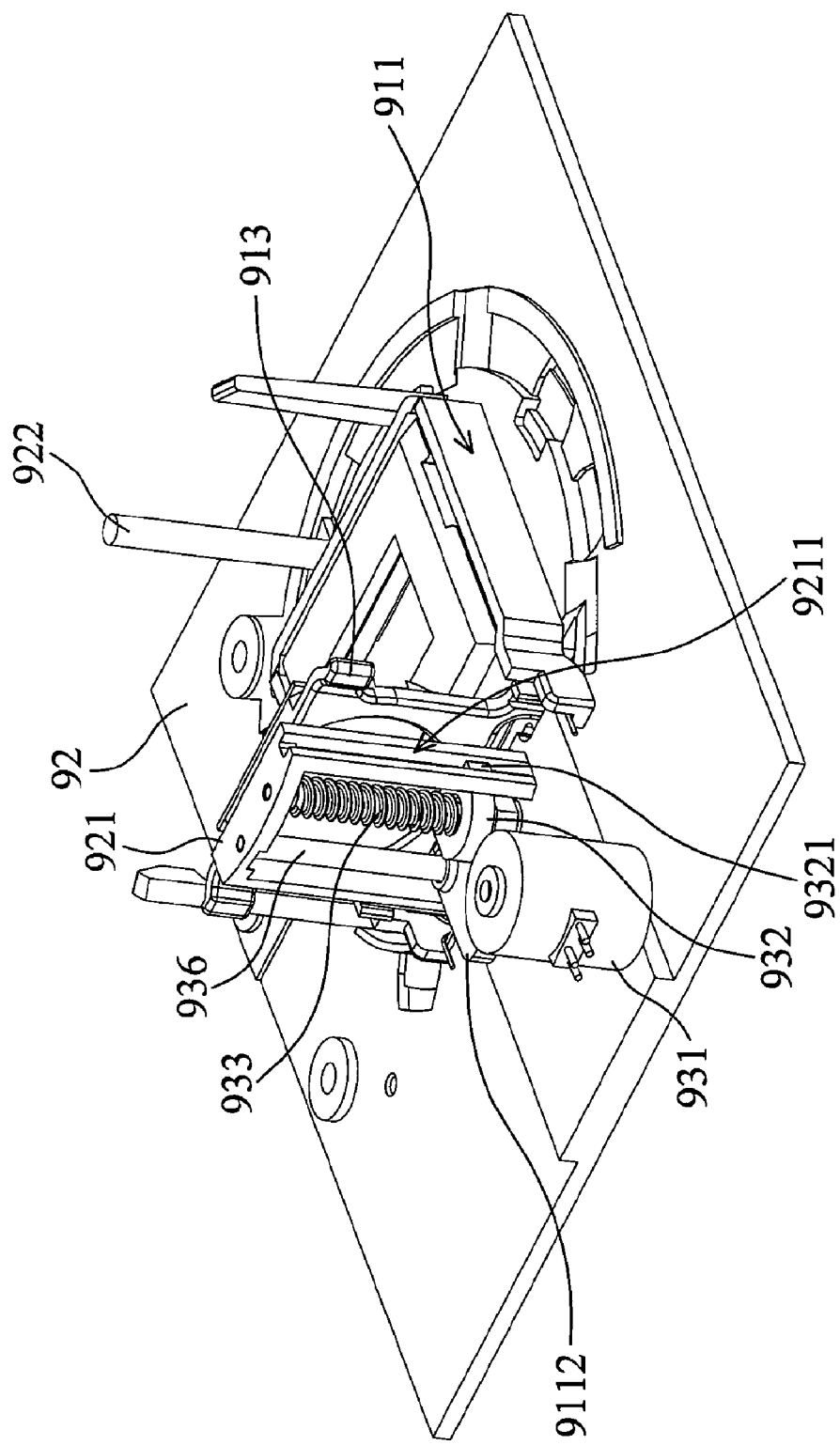
FIG. 6 is an enlarged view of the base of the invention.

Referring to FIGS. 4, 5 and 6, a track frame 921 is perpendicularly disposed on the base 92 and along the optical axis OA. The track frame 921 can integrally formed with the base 92. A groove 9211 extending along the optical axis OA is formed on one side of the track frame 921. The screw bar 933 is perpendicular to the base 92 with one end joined to the track frame 921 and the other end joined to the base 92. The nut 932 has a protrusion 9321 engaging the groove 9211. When the screw bar 933 rotates, the track frame 921 constrains the nut 932 along the optical axis OA without rotation.

Figure 7A:
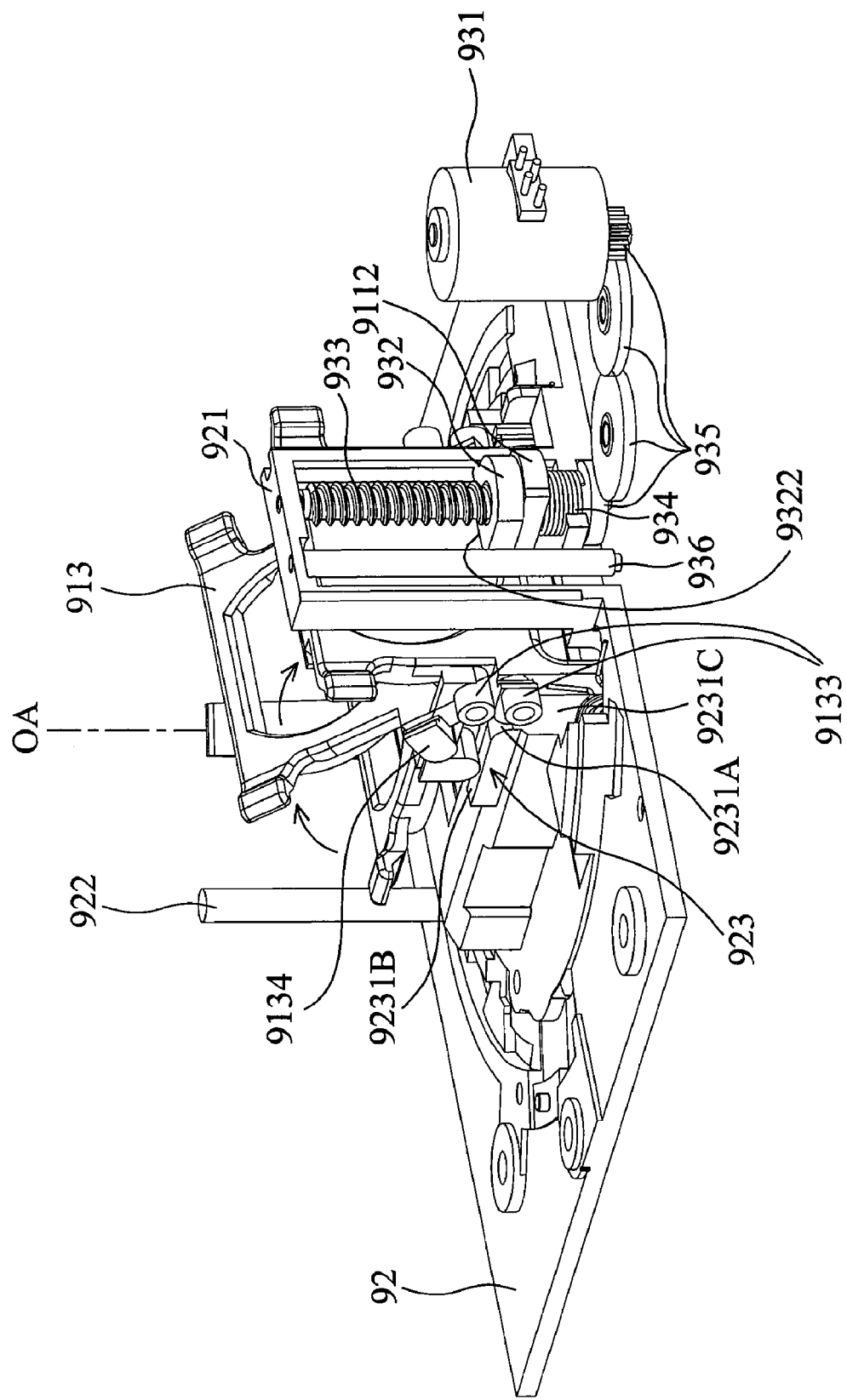
FIGS. 7A and 7B are perspective views of the base of the invention.
Figure 7B:
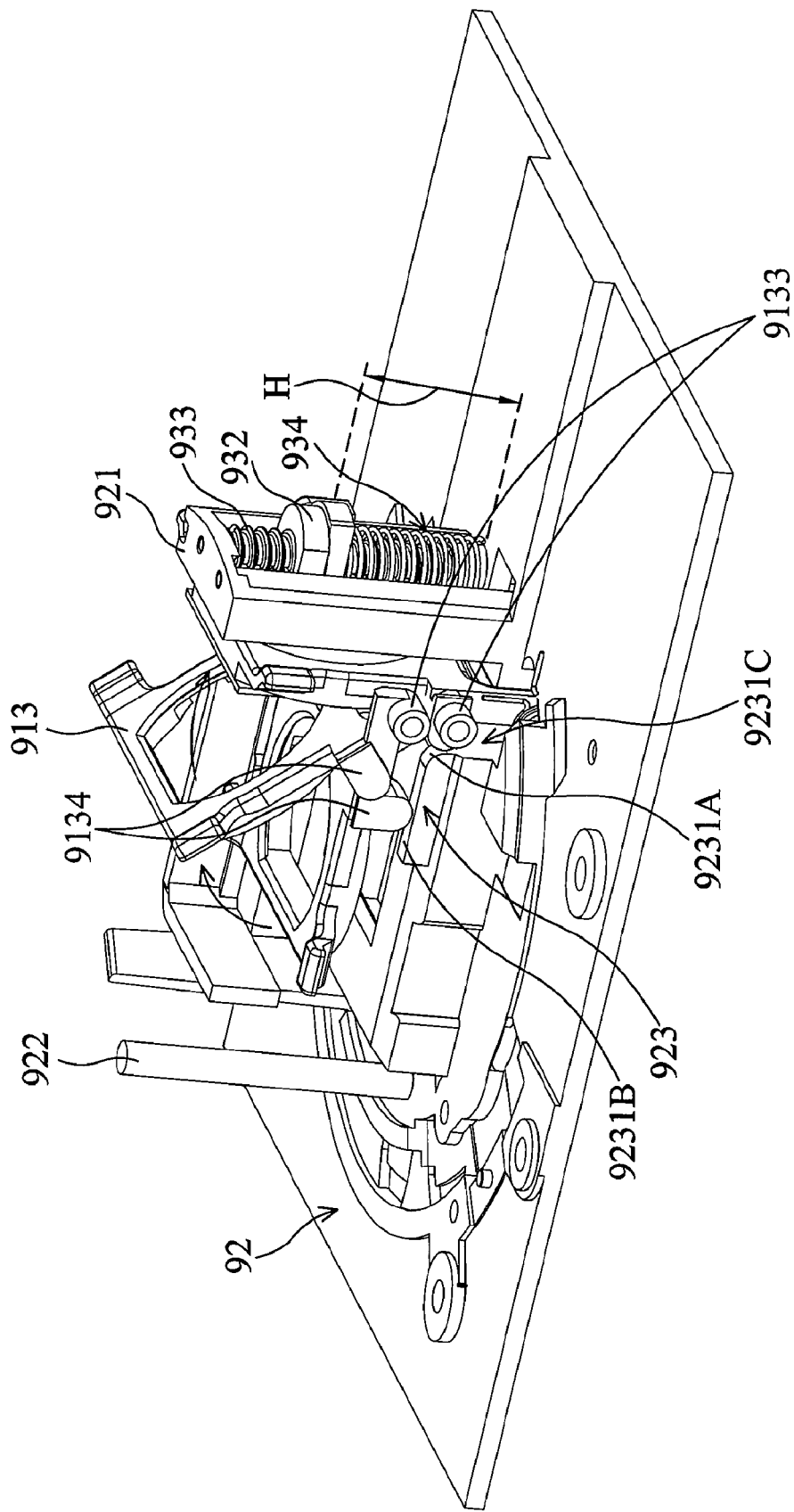

Referring to FIGS. 4, 7A and 7B, a block 923 is disposed on the base 92 and has a track 9231. The track 9231 has a first surface 9231B parallel to the base 92, a second surface 9231C perpendicular to the base 92, and a curved surface 9321A connecting the first and second surfaces 9231B and 9231C. The inner frame 913 has a cam 9134 abutting the track 9231. The nut 932 has an abutting portion 9322 abutting the side 9131 of the inner frame 913. When the distance between the nut 932 and the base 92 exceeds a predetermined height H, the abutting portion 9322 abuts the side 9131, and the nut 932 and the compression spring 934 clamp the moving frame 911. The motor 931 rotates the screw bar 933 via the gear set 935, and the moving frame 911 and the inner frame 913 are clamped by the nut 932 and compression spring 934 to move along the optical axis OA. When the distance between the nut 932 and the base 92 is less than a predetermine height H, the abutting portion 9322 pushes the side 9131 of the inner frame 913. When the screw bar 933 moves the nut 932 toward the base 92, the cam 9134 of the inner frame 913 abuts the track 9231 and slides from the first surface 9231B to the second surface 9231C via the curved surface 9231A. Simultaneously, the nut 932 and the compression spring 934 move the moving frame 911 toward the base 92, and the inner frame 913 rotates about the axis of the shaft holder 9133 which is joined to the third through hole 9115. The inner frame 913, originally perpendicular to the optical axis OA, rotates to depart from the optical axis OA. At this time, the inner frame 913 is perpendicular to the moving frame 911. The inner frame 913 can also rotate to the optical axis OA, parallel to the moving frame 911. At this time, the lens set 912 is aligned with the first lens cone 20 and the second lens cone 30 and ready for use.

Figure 8:
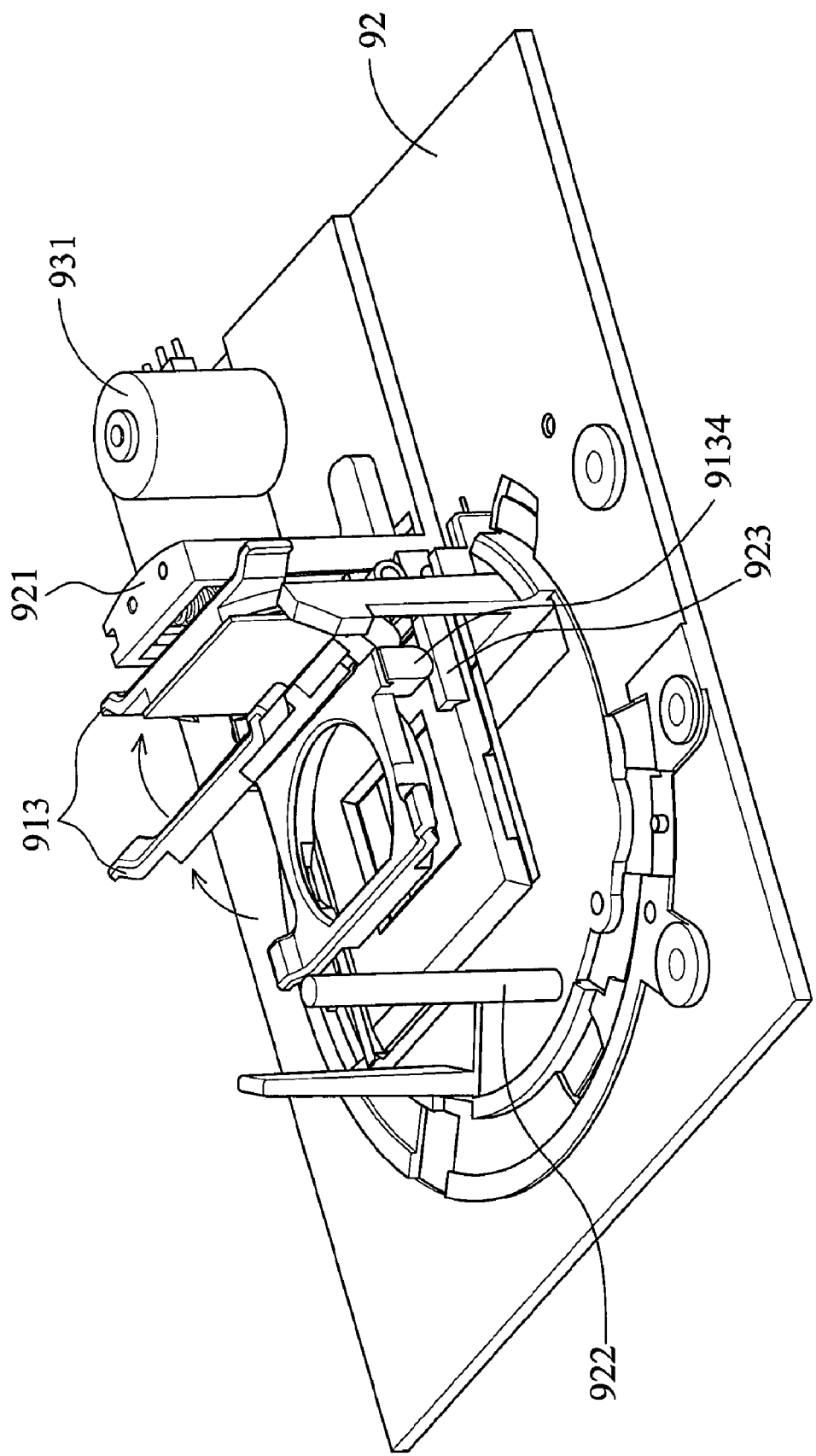
FIG. 8 depicts the moving frame moving along the optical axis.

Referring FIGS. 4 and 8, a primary shaft 936 parallel to the optical axis OA extends through the second through hole 9114 and is fixed to the track frame 921. In addition, a secondary shaft 922 parallel to the optical axis OA is disposed on the base 92. In another side of the moving frame 911, such as the side 91 1B facing the stage 9112, a holding portion 9116 holds the secondary shaft 922, whereby the moving frame 911 is guided along the optical axis OA by the primary and secondary shafts 936 and 922.

Figure 9:
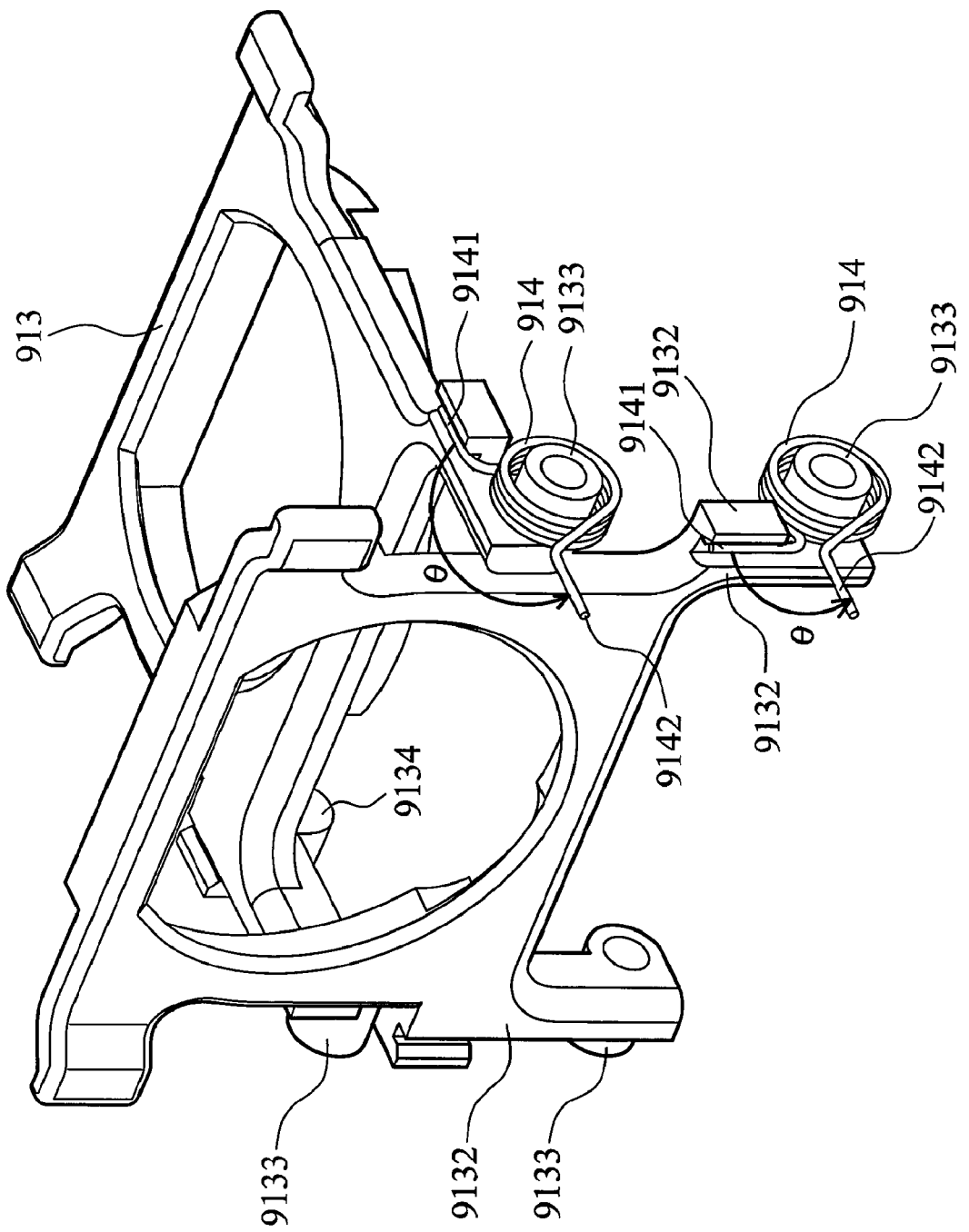
FIG. 9 depicts the torsion spring joined to the inner frame and the moving frame.
Figure 10:
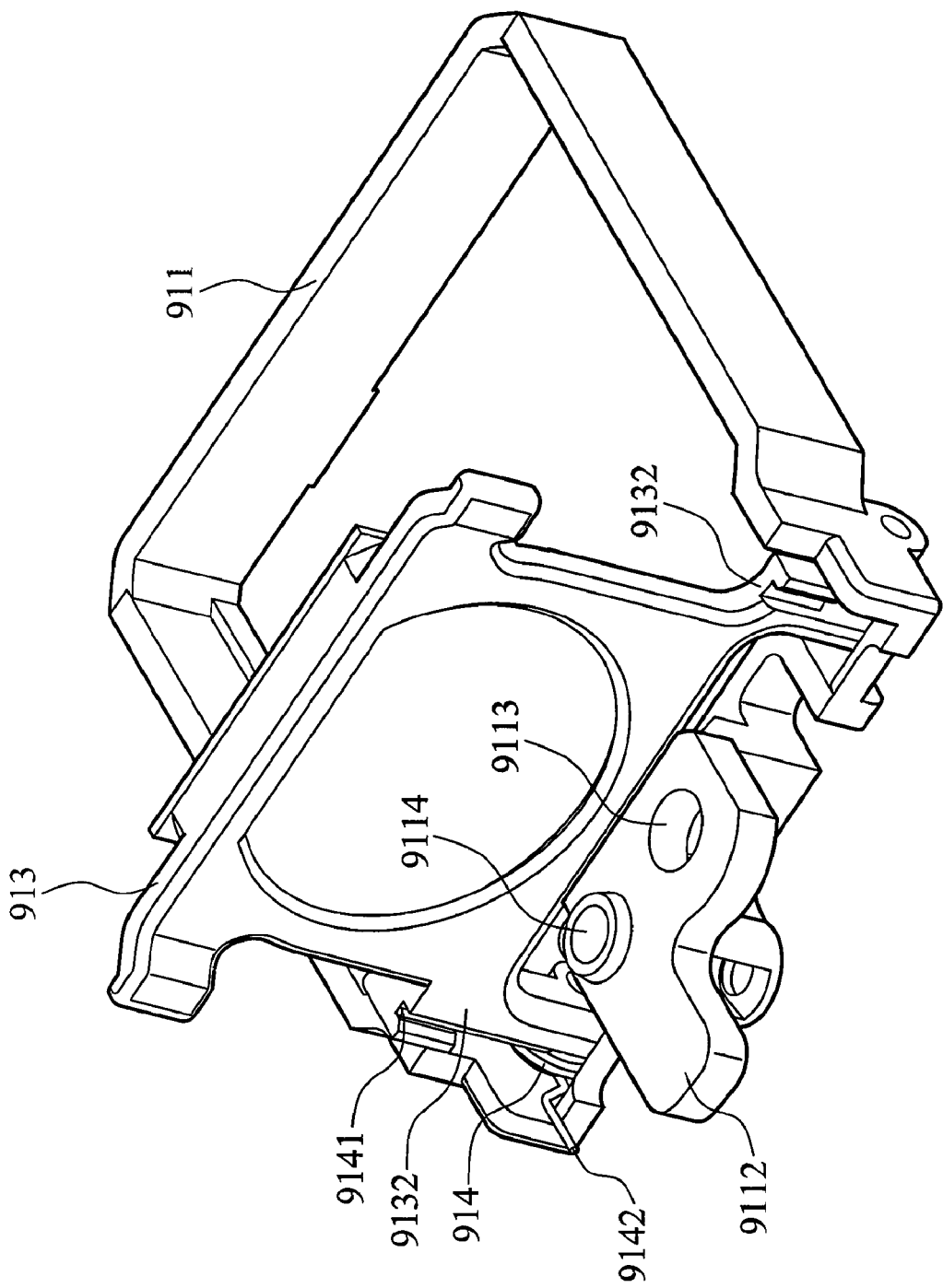
FIG. 10 depicts the motion of the torsion spring during the rotation of the inner frame.

Referring to FIGS. 9 and 10, the torsion spring 914 has one end 9141 fixed to the inner frame 913 and the other end 9142 fixed to the moving frame 911. When the inner frame 913 is perpendicular to the optical axis OA, the angle θ is formed between the ends 9141 and 9142. When the inner frame 913 rotates to depart from the optical axis OA, the torsion spring 914 is compressed and the angle θ reaches a minimum.

Referring to FIG. 4, the lens set 912 comprises at least one lens 912A and a filter 912B. When not use, the lens set 91 is rotated about the axis perpendicular to the optical axis OA by the driving portion 93, whereby the lens set 91 departs from the optical axis OA and is positioned on one side of the first and second lens cones 20 and 30. As the filter 912B near the image side also rotates to depart from the optical axis OA, the total length of the lens set assembly is reduced.

Referring to FIG. 4, the base has an opening 924 coaxial with the optical axis OA. An image capturing unit, such as CCD or CMOS is disposed in the opening 924.

The lens set assembly of the invention can be applied to a digital camera and other optical devices.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens set assembly, comprising
an object side facing an object;
an image side facing an image generated by the lens set assembly;
a plurality of lens sets disposed from the object side to the image side sequentially, wherein when the lens set assembly is used, the lens sets are all disposed along an optical axis, and when the lens set assembly is not in use, the lens set adjacent to the image side rotates about an axis perpendicular to the optical axis to depart from the optical axis, and the other lens sets move toward the image side.

2. The lens set assembly as claimed in claim 1 further comprising:
a driving portion moving the lens set adjacent to the image side along the optical axis when the lens set is used, and rotating the lens set adjacent to the image side about the axis perpendicular to the optical axis; and
a base bearing the driving portion and the lens set adjacent to the image side.

3. The lens set assembly as claimed in claim 2, wherein the lens set adjacent to the image side comprises:
at least one lens adjacent to the image side;
a moving frame comprising a stage on one side thereof, which comprises a first through hole along the optical axis and a second through hole along the axis perpendicular to the optical axis;
an inner frame securing the lens and comprising at least one arm extending from one side thereof and a shaft disposed on the end of the arm and perpendicular thereto;
a torsion spring with one end fixed to the inner frame and the other end fixed to the moving frame, wherein the shaft is inserted into the torsion spring and the second through hole.

4. The lens set assembly as claimed in claim 3, wherein the driving portion comprises:
a motor;
a gear set disposed on the base and engaging the motor;
a screw bar with one end joined to the gear set through which the screw bar is rotated by the motor;
a compression spring into which the screw bar is inserted;
a nut joined to the screw bar after the compression spring and the moving frame joined to the screw bar, whereby the stage is clamped between the spring and the nut.

5. The lens set assembly as claimed in claim 4 further comprising:
a track frame perpendicularly joined to the base along the optical axis and fixed to the other end of the screw bar and having a groove on one side extending along the optical axis; and
a block having a track with a first surface parallel to the base, a second surface perpendicular to the base and a curved surface connecting the first and second surfaces, wherein the screw bar is perpendicular to the base with one end fixed to the track frame and the other end fixed to the base.

6. The lens set assembly as claimed in claim 5, wherein the nut has a protrusion engaging the groove, and when the screw bar rotates, the track frame constrains the nut along the optical axis without rotation.

7. The lens set assembly as claimed in claim 5, wherein the nut further has an abutting portion, and when the distance between the nut and the base exceeds a predetermined height, the abutting portion abuts the inner frame and the nut and the compression spring clamp the moving frame to move, whereby the motor rotates the screw bar through the gear set to move the moving frame and the inner frame, and when the distance between the nut and the base is less than the predetermined height, the abutting portion abuts the inner frame along the optical axis, and when the screw bar moves the nut toward the base, a cam of the inner frame abuts the track and slides from the first surface to the second surface via the curved surface, as the nut and the compression spring clamp the moving frame toward the base and the inner frame is rotated about the shaft to depart from the optical axis.

8. The lens set assembly as claimed in claim 5, wherein the stage comprises a third through hole, and the driving portion further comprises a primary shaft parallel to the optical axis and extending through the third through hole, and the primary shaft is fixed to the track frame, whereby the moving frame moves along the optical axis.

9. The lens set assembly as claimed in claim 8, wherein the base comprises a secondary shaft disposed along the optical axis, and the moving frame further comprises a holding portion disposed on one side facing the stage and holding the secondary shaft, whereby the moving frame moves along the optical axis.

10. The lens set assembly as claimed in claim 3, wherein the lens set adjacent to the image side further comprises a filter disposed between the lens and the image side and fixed to the inner frame.

* * * * *